United States Patent Office 3,050,384
Patented Aug. 21, 1962

3,050,384
MANUFACTURE OF COMPLEX FERTILIZERS
Bernard Bigot, a Grand-Quevilly, France, assignor to
Compagnie de Saint-Gobain, Paris, France
No Drawing. Filed May 27, 1959, Ser. No. 816,057
Claims priority, application France June 10, 1958
9 Claims. (Cl. 71—39)

The present invention relates to a method of making complex fertilizers by attacking phosphate fertilizer clay containing calcium phosphate with nitric acid, neutralizing the reaction product with ammonia and converting calcium nitrate to calcium carbonate by an addition of carbon dioxide during which there is a simultaneous formation of ammonium nitrate. This known process may be deemed to undergo certain definite reactions of which the following equations are illustrative:

(a) *Acid Attack*

(1) $Ca_3(PO_4)_2 + (4+x)HNO_3 = CaH_4(PO_4)_2 + 2Ca(NO_3)_2 + xHNO_3$ (2) $nCaCO_3 + 2nHNO_3 = nCO_2 + nH_2O + nCa(NO_3)_2$

The value $x$ of $HNO_3$ which remains in a free state is a function of the composition of the phosphate and of the composition desired in the final fertilizer.

(b) *Neutralization of Free Acid*

The free nitric acid remaining in the reaction mass is neutralized by the addition of ammonia to that mass according to the reaction (3) $xHNO_3 + NH_3 = xNH_4NO_3$ (c) *Transformation of Monocalcium Phosphate to Bicalcium Phosphate*

(4) $CaH_4(PO_4)_2 + 2Ca(NO_3)_2 + 2NH_3 + xNH_4NO_3 = 2CaHPO_4 + Ca(NO_3)_2 + (x+2)NH_4NO_3$ (d) *Ammoniation and Carbonatation Transforming Calcium Nitrate to Calcium Carbonate and Ammonium Nitrate*

(5) $2CaHPO_4 + Ca(NO_3)_2 + (x+2)NH_4NO_3 + CO_2 + H_2O + 2NH_3 = 2CaHPO_4 + CaCO_3 + (x+4)NH_4NO_3$

The calcium nitrate resulting from reaction 2 undergoes a similar conversion but of the following reaction:

(6) $nCa(NO_3)_2 + nCO_2 + nH_2O + (2n)NH_3 = nCaCO_3 + (2n)NH_4NO_3$ (e) *Introduction of a Potassium Salt, for Example, a Chloride*

(7) $NH_4NO_3 + KCl = KNO_3 + NH_4Cl$

This addition of potassium may be accomplished at any stage after the neutralization of free acid (b), reaction between the potassium salt and the calcium nitrate then proceeding according to the reaction (8) $Ca(NO_3)_2 + 2KCl = 2KNO_3 + CaCl_2$ (f) *The Reaction Mass Is Then Dried or Dried With Granulation*

In order that the situation may be comprehended clearly, it should be observed that at the end of the neutralization phase (b) the pH rises to about 2.5 to 3; at the end of the ammoniation phase (c) the pH rises to about 6 to 8, and at the end of the phase of carbonatation (d) the pH rises to about 7 to 10.

Formerly, it was generally agreed that it was impossible in practice to ammoniate beyond a pH of 4.55 without risking a reversion of mono or bicalcium phosphate to insoluble tricalcium phosphate, insoluble in ammoniacal citrate of ammonia, without introducing during the acid attack (a) or during the ammoniation (b) certain stabilizing salts of which aluminum sulphate, iron sulphate and magnesium sulphate are examples. It has been proposed to use as stabilizers, particularly in cases where the raw materials contain pure phosphates or metallic impurities such as moroccan phosphate, metallic salts such as the sulphates of aluminum, iron, chrome and manganese, this addition being effectuated before or during the acid attack and, in any case, before ammoniation. In that process the quantity of stabilizer employed is substantial, it having been proposed, for example, to use an amount corresponding to at least 20 atom-grams of metal for each 100 molecules of $P_2O_5$.

It is an object of the invention, which has been accomplished, to carry out the ammoniation and the carbonatation, as well as the other phases of the process, without the addition of stabilizing salts and without introducing the reversion of $P_2O_5$ to an insoluble form.

It is another object of the invention which has been attained to devise useful variants and improvements of the new process.

The objects of the invention are accomplished, generally speaking, by attacking the phosphate with nitric acid, introducing ammonia for neutralization and at the beginning of the ammoniation, simultaneously with the ammonia, introducing $CO_2$. The first introduction of ammonia and $CO_2$ need not be simultaneous but the $CO_2$ should be introduced when the pH reaches 4.5 to 6. In this first introduction of $CO_2$ the proportion of $CO_2$ to ammonia is between .1 and .4 mole of $CO_2$ for every 2 moles of $NH_3$. When the pH of the reaction mass reaches 7, the proportion of $CO_2$ to $NH_3$ is increased to 1.05 to 1.5 moles for each 2 moles of $NH_3$. During the carbonatation phase (d), the temperature of the reaction mass should be below 80°. In all cases, it is necessary to keep the reaction mass below boiling.

The ammoniated and carbonated sludges obtained under these conditions are stable and can be dried without reversion of $P_2O_5$ and without substantial loss of $CO_2$, provided that the drying is carried out at a temperature below 60° C. If it is desired to carry out the drying more swiftly and at a higher temperature, the product may be disposed in thin layers and the temperature raised not substantially above 70° C. A third method of drying is to add portions of the dried final product, such as the fines, to the reaction product while maintaining the temperature below 70° C.

The drying should reduce the moisture content to not more than 1% and preferably not over .5% of water. The product may be preserved for several months in a chamber from which humid air is excluded or in sacks which are impervious to humid air without substantial decomposition. The process can be carried out in batches or continuously, in the latter case, in a series of reaction vessels disposed in cascade.

EXAMPLE 1

Gafsa phosphate containing 30% $P_2O_5$ was admitted to an agitated vessel with nitric acid in a proportion of 282 kilos of phosphate and 488 kilos of 52% $HNO_3$. When the acid attack was completed, ammoniation was begun and consumed a total of 68.5 kilos of anhydrous $NH_3$. During ammoniation the following operations were carried on:

When the pH of the sludge reached 3.5, there were introduced 340 kilos of potassium chloride containing the equivalent of 62% $K_2O$.

When the pH of the sludge reached 4.5, $CO_2$ was introduced at the ratio of .2 mole for each 2 moles of $NH_3$ which were introduced at the same time. The proportion relates to the amounts of the ingredients which were simultaneously admitted to the sludge.

When the pH of the sludge attained 7, the proportion of $CO_2$ was increased to 1.2 moles for every 2 moles of $NH_3$. The proportion related to the ingredients as they were simultaneously admitted.

During the operations described above, 52 kilos of $CO_2$ were admitted to the sludge. The sludge then received some recycled final product including a substantial amount of fines, the amount of fines being sufficient to induce granulation of the product. The product was dried at a temperature below 60° C. After cooling, the product was stocked in sealed chambers and some of it was put into impermeable sacks. There was thus produced one ton of fertilizer which by analysis was 11.25% of total nitrogen divided half and half between nitric and ammoniacal nitrogen, 8 to 8.2% assimilable $P_2O_5$ out of 8.45% total $P_2O_5$, and 20.3% $K_2O$. By adding 22 kilos of ballast sand, kieselguhr, or the like, the composition of the fertilizer became 11-8-20.

The process decsribed above is more economical than known processes particularly because it produces complex fertilizers by nitric acid attack on phosphates of fertilizer grade particularly natural phosphate, followed by ammoniation and carbonatation without the use of stabilizers or the other adjuvants which had been customarily used in order to stabilize the sludge and to prevent the reversion of the mono or bicalcium phosphate to the tricalcium form.

It has been possible to add to this process other advantages and to overcome that inconvenience which required that the operations of granulation and drying be carried out under conditions which substantially excluded moist air. In order to avoid this necessity and to produce a fertilizer which can be stored for substantial periods even in the presence of moist air, and to give wider scope to the carbonatation and drying by permitting these operations to be carried out at higher temperatures, there was added to the sludge after the end of the carbonatation, when its pH had reached 7 to 10, for instance during drying, some of the known adjuvants mentioned hereinabove or, during the ammoniation known fluidifiers, or stabilizers, which oppose the reversion to tricalcium phosphate.

This mode of carrying out the process is distinguished from prior processes which utilized the same adjuvants by all the substantial points of novelty pointed out in connection with the basic new process, including the regulation of the ratio of $CO_2$ to $NH_3$ and by the fact that the addition of these additives occurs in later stages of the process than was necessary in the prior art, and this is a substantial advantage.

The quantity of additive introduced according to this form of the invention is less than the quantity of the same adjuvant that was required in the process of the prior art. This is in part due to the fact that in the present invention the additive has only one function, to stabilize during drying and storing, whereas in prior processes it was necessary to use more stabilizer because most of it was consumed in stabilizing the carbonatation reaction to prevent precipitations of active cations, hydrolyses and dissociation in acid medium. It sometimes occurs that the inlet port of a gas becomes obstructed during the carbonatation and this leads to a brutal reversion of product. The introduction of a little stabilizer during or toward the end of the carbonatation prevents this reversion in case of such an accident but is not necessary for the proper functioning of the process. It has been observed that the efficiency of different stabilizers is the greater as they are introduced into a later phase of the process, and this forms an advantage of the present invention, and it follows from this the amount of stabilizer required to produce a given result is the less as its introduction is the later. This is very advantageous because hydrolysable salts and alkaline salts which are destroyed in acid media cannot be used except in a later stage. By introducing the stabilizer in a late stage, this invention permits the use of such salts and enlarges the field of useful stabilizers while reducing the quantity required.

According to the present invention, this reduction in quantity follows a rough proportion. If we assume an amount to be required to achieve a certain stabilization if added during the acid attack only about half $$\left(\frac{x}{2}\right)$$

is required if the introduction is made at the beginning of carbonatation, only one-third if the carbonatation is 50% complete and only one-quarter if the addition is made at the end of carbonatation or the beginning of drying. Certain salts have the power to sequester calcium ions and among these are alkali polyphosphates such as sodium tripolyphosphate, potassium tripolyphosphate, the tetrapolyphosphates, the metaphosphates, the pyrophosphates and the hexametaphosphates, but they have no effect when introduced in acid medium. If they are added at the end of ammoniation or beginning of carbonatation, it requires 3% of the weight of the phosphate treated, whereas one obtains an equal action if 2% is added when carbonatation is 50% complete and the same effect is secured if 1 to 1½% by weight of the phosphate is added at the end of carbonation or during drying.

Other calcium ion sequestrants have also been found efficient, such as the organic salts of ethylenediaminotriacetic acid and ethylenediamino-tetracetic acid, the useful proportions being substantially the same in the same stages as for the phosphates above named.

Buffer salts such as alkali polyacids or alkali salts of weak acids such as boric, citric, tartaric, phthalic, acetic and monochloracetic, are also useful and follow the same rules for addition. For example, while it takes 6% of sodium borate or sodium citrate based on the weight of the phosphate, if the introduction is made at the beginning of carbonatation, it requires only 4% if the introduction is made when carbonatation is 50% and only 2 to 3% just before drying.

It is also possible to stabilize by adding minerals, for instance of the type customarily used as ballast, to adjust the content of a fertilizer to that required. Among these are calcium carbonate and calcium sulphate as well as others of low solubility such as strontium carbonate and sulphate and barium sulphate and carbonate.

The quantities of stabilizers which are useful are given only to illustrate efficient practice. It is not possible to fix a maximum because the phenomenon of stabilization does not disappear when even a large excess is used, so that considerations of economy or final content of the fertilizer are the limiting factors. On the other hand, one cannot fix a minimum because, as indicated in the first portion of this specification, it is possible to work in the total absence of stabilizers, provided one utilizes the basic teaching of this invention. When the different stabilizers are used together, their general effect is additional, although in some cases the action of two stabilizers when added together is superior to the sum of the effects taken singly, this being particularly the case when one utilizes together salts which have sequestrating power for calcium and buffer salts.

The operative procedure of this invention is not limited to the manufacture of complex fertilizers by nitration followed by ammoniation and carbonatation, but may be applied with benefit to cases in which the acid attack is carried out by means of nitric acid mixed with sulphuric or phosphoric, producing a final product in which the content of $P_2O_5$ is equal or superior to that of nitrogen, which is not possible in the case of an attack by nitric acid alone unless one accepts the necessity of isolating by-products by crystallization or precipitation. When a sulfo-nitric or phospho-nitric acid mixture is used, nothing is changed in the new process, except that the quantity of CO₂ admitted is reduced as a function of the quantity of SO₄ and PO₄ ions which have been introduced. In other words, it is not necessary to supply CO₂ to valences which are occupied by SO₄ or PO₄. The following examples are not limitative but show the flexibility of the process and the scope of composition which can be imparted thereby to the final product.

EXAMPLES 2–5

Operating exactly as in Example 1 but replacing part of the 22 kilograms of ballast by an equal weight of one of the following stabilizers:

Example 2—9 kilograms of ferrous sulphate at 7 $H_2O$.
Example 3—3 kilos of sodium hexametaphosphate.
Example 4—6 kilos of sodium tartrate.
Example 5—22 kilos of gypsum.

The fertilizers thus produced have the same formula as that of Example 1 but it is not necessary to take the same precautions during granulation, drying and storing. Exclusion of moist air is unnecessary.

EXAMPLE 6

In an agitated vessel containing 455 kilos of 55% nitric acid there was introduced 275 kilos of moroccan phosphate containing 75% of tricalcium phosphate. When the attack was ended, the product was treated with the quantity of ammonia necessary to neutralization of free acidity, then to precipitation of bi-calcium phosphate, 37.3 kilos of anhydrous ammonia being used. During the latter phase 335 kilos of potassium chloride equivalent to 60% $K_2O$ was introduced. Toward the end of the ammoniation 2 kilos of $CO_2$ were added continuously with the ammonia. Thereafter, 24 kilos of stabilizer (aluminum sulphate containing 18 moles of water) and 33 kilograms of ammonia and 40 kilograms of $CO_2$ were added continuously and simultaneously. The sludge thus obtained was dried and granulated by known procedures not involving exclusion of moist air.

One ton of fertilizer containing 5.55% nitric nitrogen, 5.55% ammoniacal nitrogen, 9.05% assimilable $P_2O_5$ out of 9.25% total, and 20.1% $K_2O$. This formula was 11, 9, 20.

According to a variation, one may also include 18 kilos of aluminum sulphate and not all at the stage of carbo-ammoniation, but 9 kilos at the beginning of that phase and 9 kilos when the carbo-ammoniation reaches 50%.

EXAMPLE 7

435 kilos of moroccan phosphate containing 75% tricalcium phosphate was attacked with 715 kilos of 52% nitric acid. When the attack ended, anhydrous ammonia was introduced in a quantity of 52.2 kilos to achieve neutralization and the precipitation of bicalcium phosphate. When 50 kilos of $NH_3$ had been added, the sludge became relatively thick and .5 kilo of sodium hexametaphosphate was added to increase the absorption of $CO_2$. It was introduced, simultaneously with the ammonia, and continuing to the end of the precipitation of bicalcium phosphate. When that operation was finished, there was simultaneously introduced 24 kilos of $NH_3$ and 36 kilos of $CO_2$. Therefore, there had been added to the sludge 8 kilos of sodium tripolyphosphate and the operation was ended by simultaneously adding 24 kilos of ammonia and 33 kilos of $CO_2$. Drying and granulation was by classical methods without exclusion of moist air.

The product titrated 16.5% total ammonia, 14.5% assimilable $P_2O_5$ out of 15% total. This constituted 16.5–14.5–0 and could be brought to 16–14–0 or any other selected binary mixture in the same proportion by the addition of ballast such as gypsum or calcium carbonate.

EXAMPLE 8

310 kilos of pebble phosphate containing 75% tricalcium phosphate after crushing, was attacked by 530 kilos of 52% nitric acid, 74 kilos of ammonia. The total necessary to all the operations was added and simultaneously therewith the following additions took place:

When the pH reached 4, 272 kilos of KCl equivalent to 60% $K_2O$ were added.

When the pH entered the range 6 to 7, one kilo of $CO_2$ was admitted. After the pH had passed 7, 46 kilos of $CO_2$ were added in a stream, the content of which was roughly equivalent to the rate at which the ammonia was being admitted. This continued until the end of the saturation of the calcium nitrate. This stage having been terminated, there was then introduced 10 kilos of sodium borate, and granulation and drying were carried out by classic methods without the exclusion of damp air.

The fertilizer titrated 12.12% total nitrogen of which one-half was ammoniacal and one-half nitric, about 10% assimilable $P_2O_5$ out of 10.5% total and 16.15% of potassium or approximately 12, 10, 16.

EXAMPLE 9

357 kilos of crushed Togo phosphate containing 37.2% $P_2O_5$ was attacked with 564 kilos of 50% nitric acid. When the reaction had stopped, 41 kilos of $NH_3$ were added and, toward the end of the treatment (about pH 5) 209 kilos of KCl equivalent to 60% $K_2O$ and 4 kilos of sodium tripolyphosphate were added. When that reaction ended, the pH was about 7 and 45 kilos of $CO_2$ and 35 kilos of $NH_3$ were added together. The sludge was granulated and dried by classical methods. One ton containing 12% total nitrogen of which one-half was nitric and one-half ammoniacal, 12.5% assimilable $P_2O_5$ out of 13% total, and 12.5% $K_2O$ (as $KNO_3$) was obtained. By adding 40 kilograms of ballast (calcium sulphate) the content became 12, 12, 12.

EXAMPLE 10

274 kilos of morocan phosphate containing 75% tricalcium phosphate was attacked with a mixture of 75 kilos of phosphoric acid containing 32% $P_2O_5$ and 522 kilos of 52% nitric acid. The product was supplied with 73.5 kilos $NH_3$ which is sufficient for all the phases of the operation. During this treatment with ammonia, 152 kilos of KCl equivalent to 60% $K_2O$ was added when the pH was between 2 and 7. 2 kilos of $CO_2$ were admitted, one-half at pH 4.5 and one-half at pH 7. 8 kilos of sodium tripolyphosphate were added about pH 7. 25 kilos of $CO_2$ after the pH had passed 7. When the operation was terminated, 150 kilos of KCl equivalent to 60% $K_2O$ was added and the mass was granulated and dried. This produced a ton of fertilizer containing 12% total nitrogen, half and half, 12% $P_2O_5$ substantially all of which was assimilable, and 18% $K_2O$.

The invention includes a process of making complex fertilizers by the attack of nitric acid on neutral phosphate followed by neutralization with ammonium and carbonatation of the calcium nitrate to calcium carbonate by the addition of $CO_2$, this process being characterized in that after having effectuated the nitric attack and starting the ammoniation, $CO_2$ and $NH_3$ were added together in a proportion between .1 and .4 mole for each 2 moles of $NH_3$ when the pH was between 4.5 and 6. The input of $CO_2$ was raised to 1.05 to 1.5 for each 2 moles of $NH_3$ when the pH attained 7. During the carbonatation, the temperature was maintained below the boiling point. Drying was carried out below 70° and preferably below 60°.

The process contains a development in which a stabilizer opposing the reversion of mono and bicalcium to tricalcium phosphate is added, the addition being the less as the time of addition is later. The process is applicable to methods in which the acid used to open the phosphate contains phosphoric or sulphuric acid in addition to nitric acid.

What is claimed is:

1. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonatation, which consists in its essential steps of reacting phosphate of fertilizer grade containing calcium phosphate with nitric acid, neutralizing the free acidity of the reaction mass by introducing ammonia until the pH is in the range 4.5 to 6, adding $CO_2$ and additional ammonia in a proportion of 0.1 to 0.4 mole $CO_2$ to each 2 moles $NH_3$ until the pH attains 7, adding additional $CO_2$ and ammonia to the reaction mass of pH 7 in a proportion of 1.05 to 1.5 moles of $CO_2$ to each 2 moles $NH_3$ until the conversion is completed, maintaining the temperature in the foregoing steps below boiling, introducing a potassium salt after the ammoniation begins, drying the product of the successive ammoniations and carbonatations, at a temperature below 70° C., to about 0.5 to 1% water content while excluding humid air, and storing the product with exclusion of humid air.

2. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonatation, which consists in its essential steps of reacting phosphate of fertilizer grade containing calcium phosphate with nitric acid, neutralizing the free acidity of the reaction mass by introducing ammonia until the pH is in the range 4.5 to 6, adding $CO_2$ and additional ammonia in a proportion of 0.1 to 0.4 mole $CO_2$ to each 2 moles $NH_3$ until the pH attains 7, adding additional $CO_2$ and ammonia to the reaction mass of pH 7 in a proportion of 1.05 to 1.5 moles of $CO_2$ to each 2 moles $NH_3$ until the conversion is completed, maintaining the temperature in the foregoing steps below boiling, drying the product of the successive ammoniations and carbonatations at a temperature below 70° C. to about 0.5 to 1% water content while excluding humid air, and storing the product with exclusion of humid air.

3. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonatation, which consists in its essential steps of reacting phosphate of fertilizer grade containing calcium phosphate with nitric acid, neutralizing the free acidity of the reaction mass by introducing ammonia until the pH is in the range of 4.5 to 6, adding $CO_2$ and additional ammonia in a proportion of 0.1 to 0.4 mole $CO_2$ to each 2 moles $NH_3$ until the pH attains 7, adding additional $CO_2$ and ammonia to the reaction mass of pH 7 in a proportion of 1.05 to 1.5 moles of $CO_2$ to each 2 moles $NH_3$ until the conversion is completed, and maintaining the temperature in the foregoing steps below boiling.

4. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonatation, which consists in its essential steps of reacting phosphate of fertilizer grade containing calcium phosphate with nitric acid, neutralizing the free acidity of the reaction mass by introducing ammonia until the pH is in the range 4.5 to 6, adding $CO_2$ and additional ammonia in a proportion of 0.1 to 0.4 mole $CO_2$ to each 2 moles $NH_3$ until the pH attains 7, adding additional $CO_2$ and ammonia to the reaction mass of pH 7 in a proportion of 1.05 to 1.5 moles of $CO_2$ to each 2 moles $NH_3$ until the conversion is completed, maintaining the temperature in the foregoing steps below boiling, and drying the product of successive carbonatations and ammoniations at a temperature below 60° C. to about 0.5 to 1% water content with the exclusion of humid air.

5. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonatation, which consists in its essential steps of reacting phosphate of fertilizer grade containing calcium phosphate with nitric acid, neutralizing the free acidity of the reaction mass until the pH attains about 3.5, adding a potassium salt of fertilizer grade, continuing the neutralization until the pH is in the range 4.5 to 6, adding $CO_2$ and additional ammonia in a proportion of 0.1 to 0.4 mole $CO_2$ to each 2 moles $NH_3$ until the pH attain 7, adding additional $CO_2$ and ammonia to the reaction mass of pH 7 in a proportion of 1.05 to 1.5 moles of $CO_2$ to each 2 moles $NH_3$ until the conversion is completed, drying the product thus produced below 70° C. to about 0.5 to 1% water content while excluding humid air, and storing the product with exclusion of humid air.

6. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonatation, which consists in its essential steps of reacting phosphate of fertilizer grade containing calcium phosphate with nitric acid, neutralizing the free acidity of the reaction mass until the pH attains about 3.5, adding a potassium salt of fertilizer grade, continuing the neutralization until the pH is in the range 4.5 to 6, adding $CO_2$ and additional ammonia in a proportion of 0.1 to 0.4 mole $CO_2$ to each 2 moles $NH_3$ until the pH attains 7, adding $CO_2$ and additional ammonia to the product thus produced in a proportion of 1.05 to 1.5 moles of $CO_2$ to each 2 moles $NH_3$ until the conversion is completed, maintaining the temperature in the foregoing steps below boiling, mixing the product thus produced with fertilizer from the process, and drying below 60° C.

7. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonatation, which consists in its essential steps of reacting phosphate of fertilizer grade containing calcium phosphate with an acid comprising nitric acid, neutralizing the free acidity of the reaction mass by introducing ammonia until the pH is in the range 4.5 to 6, adding $CO_2$ and additional ammonia in proportion of 0.1 to 0.4 mole $CO_2$ to each 2 moles $NH_3$ until the pH attains 7, adding a compound from the class of stabilizers and fluidifiers while the pH is in the range 7 to 10, adding additional $CO_2$ and ammonia to the mass of pH 7 to 10 in a proportion of 1.05 to 1.5 moles of $CO_2$ to each 2 moles of $NH_3$ until the conversion is completed, maintaining the temperature in the foregoing steps below boiling, introducing a potassium salt after the ammoniation begins, and drying the product thus produced below 70° C. to about 0.5 to 1% water content.

8. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonatation, which consists in its essential steps of reacting phosphate of fertilizer grade containing calcium phosphate with an acid comprising nitric acid, neutralizing the free acidity of the reaction mass by introducing ammonia until the pH is in the range 4.5 to 5, adding $CO_2$ and additional ammonia in a proportion of 0.1 to 0.4 mole $CO_2$ to each 2 moles $NH_3$ until the pH attains 7, adding more $CO_2$ and ammonia to the mass of pH 7 in a proportion of 1.05 to 1.5 moles of $CO_2$ to each 2 moles of $NH_3$ until the conversion is completed, maintaining the temperature in the foregoing steps below boiling, introducing a potassium salt after the ammoniation begins, introducing a stabilizer after the carbonatation begins, and drying the mass thus produced below 70° C. to about 0.5 to 1% water content.

9. A method of making fertilizer of which substantially all the phosphate ion is available as plant food, from phosphate of fertilizer grade comprising calcium phosphate by the method in which nitric acid is reacted with the phosphate, the product is neutralized by ammoniation, and the ammoniated product is converted by carbonation, which consists in its essential steps of reacting phosphate of fertilizer grade containing calcium phosphate with an acid comprising nitric acid, neutralizing the free acidity of the reaction mass by introducing ammonia until the pH is in the range 4.5 to 5, adding $CO_2$ and additional ammonia in a proportion of 0.1 to 0.4 mole $CO_2$ to each 2 moles $NH_3$ until the pH attains 7, adding more $CO_2$ and ammonia to the mass of pH 7 in a proportion of 1.05 to 1.5 moles of $CO_2$ to each 2 moles of $NH_3$ until the conversion is completed, maintaining the temperature in the foregoing steps below boiling, introducing a stabilizer after the carbonatation begins, and drying the product thus produced below 70° C. to about 0.5 to 1% water content.

References Cited in the file of this patent

UNITED STATES PATENTS

| | | |
|---|---|---|
| 1,854,291 | Burdick | Apr. 19, 1932 |
| 2,555,656 | Plusje et al. | June 5, 1951 |
| 2,738,265 | Nielsson | Mar. 13, 1956 |
| 2,861,878 | Bigot | Nov. 25, 1958 |